Jan. 12, 1971  S. D. NOREM  3,554,001
THERMAL GRAVIMETRIC ANALYSIS APPARATUS
Filed Oct. 5, 1967  2 Sheets-Sheet 1

INVENTOR.
Stanley D. Norem
BY
Frank J. Thompson
ATTORNEY

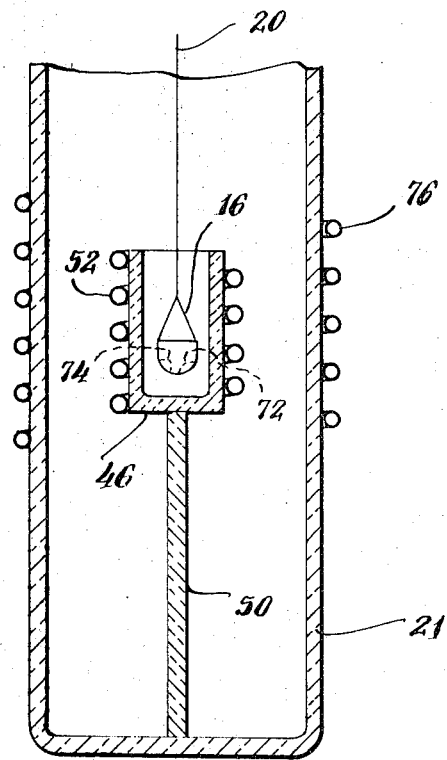
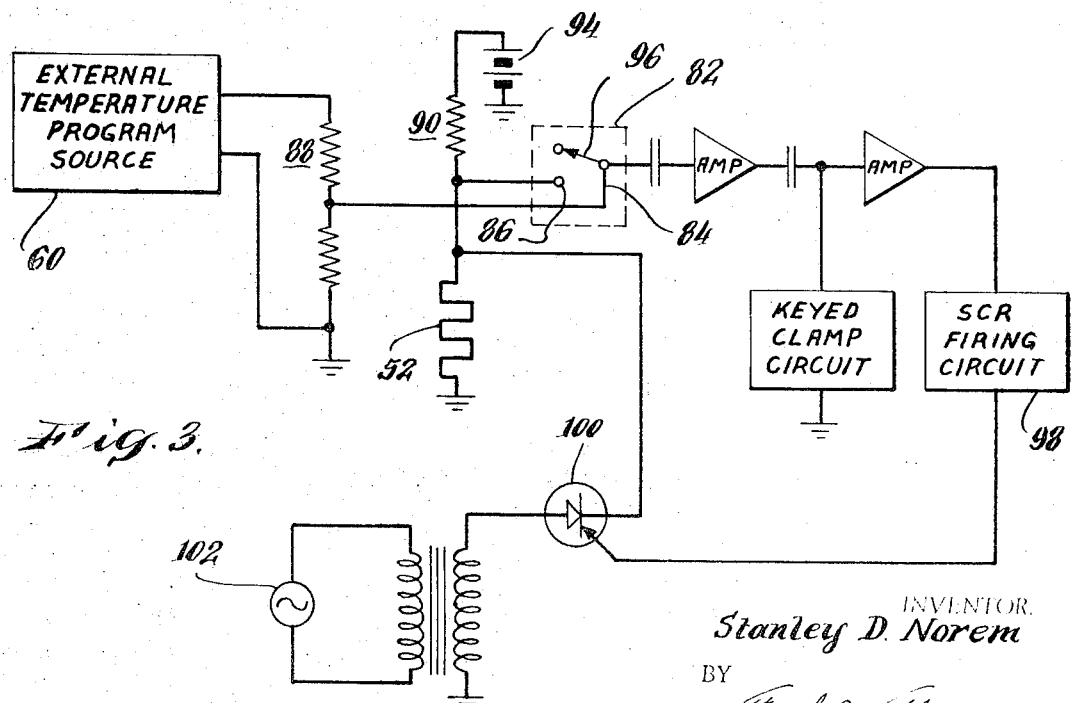

… … …

United States Patent Office 3,554,001
Patented Jan. 12, 1971

3,554,001
THERMAL GRAVIMETRIC ANALYSIS APPARATUS
Stanley D. Norem, Bayside, N.Y., assignor to The Perkin-Elmer Corporation, Norwalk, Conn., a corporation of New York
Filed Oct. 5, 1967, Ser. No. 673,098
Int. Cl. G01n 25/00
U.S. Cl. 73—1                                             9 Claims

ABSTRACT OF THE DISCLOSURE

A TGA apparatus includes a gravimetric measuring means having a sample container positioned within an enclosure. Heating means, including a furnace positioned within the enclosure, are provided for heating the sample container over a predetermined range of temperatures. A magnetic field is established in the vicinity of the container and a magnetic standard material having a Curie point within the predetermined temperature range is deposited in the container. Relatively close thermal coupling between furnace and temperature sensing means and an accurate, reversible, and reproducible temperature calibration is thereby effected.

---

This invention relates to an apparatus and method for Thermal Gravimetric Analysis (TGA). The invention relates more particularly to an improved apparatus and method of TGA analysis.

Thermal gravimetric analysis instruments are adapted for detecting and indicating variations occurring in the weight of a sample under analysis as the temperature of the sample is varied over a predetermined range. In one form of TGA instrument, the sample is positioned in a sample container which is suspended from a lever arm of a relatively accurate electronic balance. Heating means are disposed about the suspended sample container for varying the temperature of the sample over a predetermined range. During this heating, the sample undergoes physical changes such as the loss of moisture, etc.; the weight of the sample varies; and the balance provides a corresponding indication. The analysis is generally recorded by a chart recorder wherein the sample weight is displayed as data along an ordinate axis, for example, while the sample temperature variation over a period of time is displayed as data along an abscissa.

Accuracy in analysis of the sample depends largely upon the accuracy with which the temperature of the sample is sensed and recorded. Ideally, the sample temperature is exactly recorded for corresponding sample weights. However, a thermal lag introduced by the apparatus substantially reduces the desired accuracy. In particular, prior TGA apparatuses have utilized a sample container suspended from a balance arm within a relatively narrow tubulation member of an evacuated enclosure. An electric furnace is positioned about the tubulation and is temperature programmed for heating the sample over a range of temperatures. Positioning of the furnace outside of the enclosure introduces a substantial thermal lag between the furnace and sample temperature. In recording sample temperature, the effect of this thermal lag has been partly overcome by the use of a thermocouple element positioned within the enclosure near the sample container. A temperature indication from this thermocouple is utilized as abscissa data for chart recording.

Although this arrangement exhibits a useful accuracy, it nevertheless suffers from a relatively significant thermal lag since the thermocouple element must necessarily be spaced apart from the sample container in order to permit free movement of the sample container and balance arm. It is apparent that some small thermal lag will exist between the temperature of the sample and the temperature of a sensor element which detects sample temperature. It is desirable however to reduce this lag so that it becomes substantially insignificant. In addition, it is further desirable to provide a relatively accurate temperature calibration for the instrument in order that the operator may have a visually exact reference for indicating temperature.

Accordingly, it is an object of this invention to provide an improved form of TGA apparatus.

Another object of the invention is to provide a TGA apparatus having temperature sensing means which are relatively closely thermally coupled to a sample under analysis.

A further object of the invention is to provide a TGA apparatus adapted for providing a relatively accurate temperature calibration.

Still another object of the invention is to provide TGA apparatus having means for producing a reproducible, temperature calibrating, physical transition which can be detected gravimetrically.

In accordance with a feature of the present invention, a TGA apparatus includes a gravimetric measuring means having a sample container. Means are provided for heating the sample container over a predetermined range of temperatures. Means are also provided for establishing a magnetic field in the vicinity of the sample container. A magnetic standard material having a Curie point within the predetermined temperature range is positioned in the sample container. The magnetic field establishes a force on the standard material creating an apparent weight in excess of its gravimetric weight. As the heating means raises the standard material temperature to its Curie point temperature, the apparent weight is decreased and a distinct indication of a gravimetric variation is produced. In an alternative arrangement, the standard material is positioned in the sample container along with the sample under analysis during temperature programming of the sample. A relatively accurate arrangement for calibrating the apparatus is thereby provided. A TGA calibrating arrangement of this type is particularly advantageous in that the gravimetric transition for calibration is distinct, reversible, and reproducible.

In accordance with another feature of the invention, an electric furnace for a TGA apparatus comprises a generally cylindrical body formed of refractory material and positioned within an evacuated enclosure for the apparatus. The furnace is positioned with respect to the sample container for providing that the sample container extends into the furnace body. Means are positioned on the body for heating and sensing the temperature of the sample. Relatively close thermal coupling is thereby provided and temperature lag between sample temperature and indicated furnace temperature is substantially reduced.

These and other objects and features of the invention will become apparent from the following specification and drawings wherein:

FIG. 2 is an alternative embodiment of the invention; and,

FIG. 3 is a circuit diagram illustrating a heating and temperature sensing arrangement for use with the TGA apparatus of FIG. 1.

Figure 1:
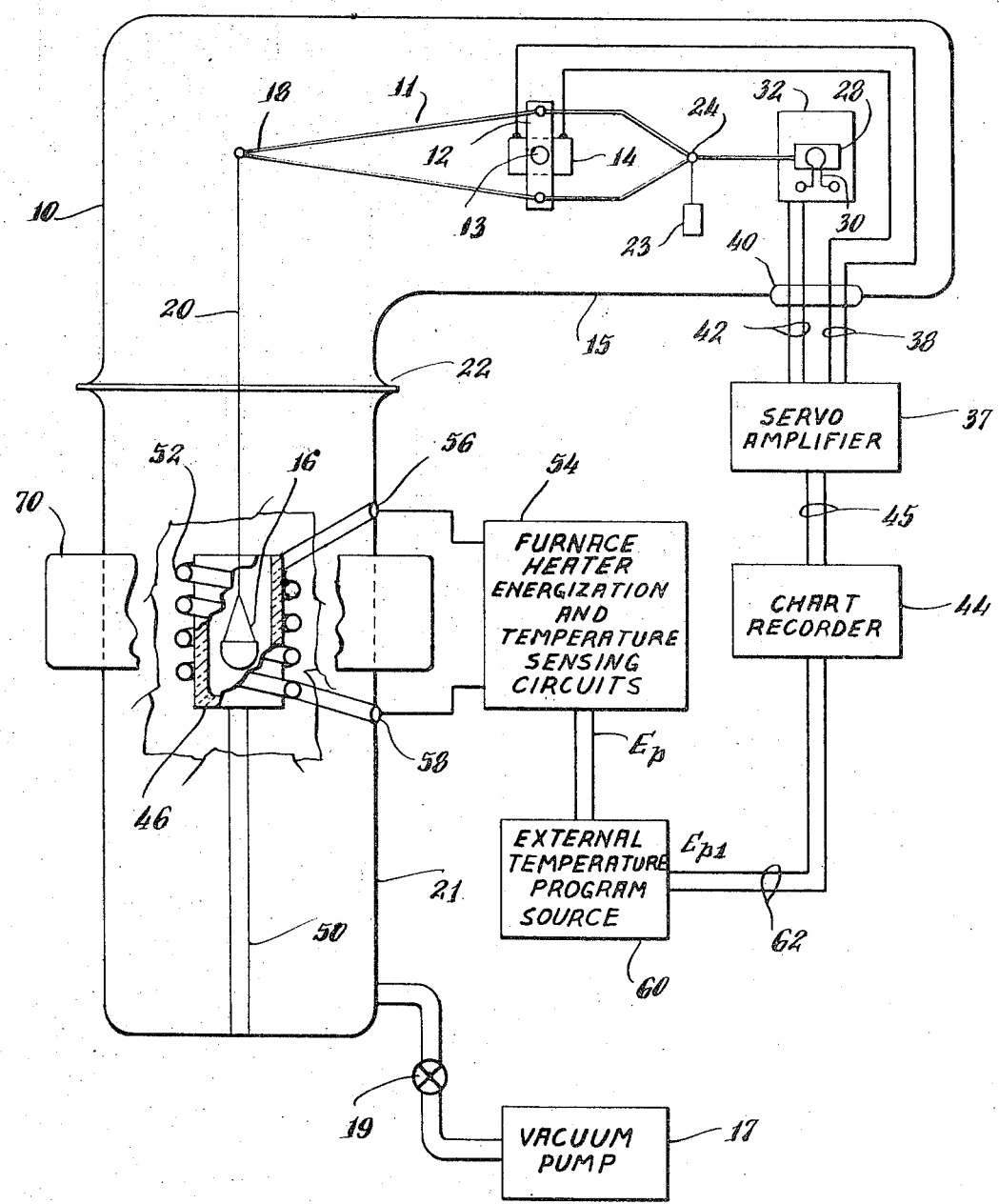
FIG. 1 is a diagram illustrating an arrangement of a TGA apparatus constructed in accordance with features of the present invention.

Referring now to FIG. 1, a weight sensing and indicating means is shown to comprise a sensitive electronic balance, such as a Cahn Model 2580, positioned in an L-shaped enclosure 10. A vacuum pump 17 is connected to the enclosure through valve means 19 for evacuating the enclosure to a desired pressure. The electronic balance includes a lever arm 11 secured to a member 12 which is rigidly mounted on a rotatable armature shaft 13 of a motor 14. These elements are positioned in a member 15 of the enclosure. A sample container 16 is suspended from one end 18 of the lever arm by a wire 20 and extends into another member 21 of the enclosure. The members 15 and 21 abut and are demountably pressure sealed at surface 22. A counterweight 23 is suspended from another point 24 of the lever arm 11 while an arm 26 extends from point 24 and supports a thin opaque disc 28. The disc 28 is disposed between a light source, represented by a filament 30, and a window, not shown, of a photoelectric detecor 32. The motor 14, light source 30 and detector 32 are spaced away from the walls and are supported within the enclosure member 15 by suitable conventional means. For purposes of clarity in the drawings, this support means is not illustrated.

Electrical energy is coupled to the detector motor from a servo amplifier 37 via leads 38 and a hermetically sealed feedthrough connector 40. A pair of leads 42 extend from the detector 32 and are coupled to the servo amplifier 37 via the feedthrough connector 40. Another pair of leads 45 extend from the servo amplifier 37 to the chart recorder 44.

In accordance with a feature of the present invention, means for heating the sample container includes an electric furnace positioned within the enclosure 10. The furnace includes a generally cylindrically shaped body 46 which is supported in the enclosure member 21 by a support rod 50. The furnace body 46 is formed of a refractory material such as beryllium oxide, a material which exhibits a relatively high thermal conductivity and a relatively high electrical insulation resistance at elevated temperatures. A heating and temperature sensing coil 52 formed of platinum wire, for example, is wound in a helix about an outer surface of the furnace body. Electrical energy for heating the sample is applied to the heating coil 52 from a source 54 via hermetically sealed feedthrough connectors 56 and 58. The source of heating energy 54 is under the control of a temperature programming means 60 and is adapted for heating the sample over a predetermined range of temperatures. As indicated in more detail hereinafter, heating of the coil 52 occurs during one portion of a heating-sensing cycle while temperature sensing occurs during another portion of the cycle.

In its general operation, the electronic balance functions as a servo system for maintaining the sample container 16 at a predetermined level within the furnace body 46. As viewed in FIG. 1, the weight of a sample exerts a counterclockwise torque on the lever arm 11. However, lever arm motion is restricted by an opposing clockwise torque exerted on the lever arm 11 by the motor 14. Any variation in sample weight occurring during temperature programming is automatically accompanied by a variation in torque exterted by motor 14 of a magnitude and direction for maintaining the established level of the container in the furnace. In particular, as sample weight varies, the lever arm 11 rotates a small distance. The position of the disc 28 is simultaneously altered and the intensity of light transmitted from the source 30 to the detector 32 is varied. A signal from the detector causes the servo amplifier 37 to vary current to the motor 14 in a manner for increasing or decreasing the torque exerted by the motor 14 in order to restore the sample container 16 to its initial level. The magnitude of current flowing in the motor 14 is proportional to the weight of the sample. An indication of motor current is coupled to the chart recorder 44 via the leads 45 for recording sample weight. As described in detail hereinafter, the furnace heater means 54 causes the heater element 52 to follow closely a desired program temperature as represented by a voltage $E_p$ provided by the source 60. The voltage $E_p$ is also coupled to the chart recorder via leads 62. Variations in the weight of the sample as determined by variations in energizing motor current are presented as ordinate data, for example, while the temperature of the sample is presented as abscissa data. The relatively close thermal coupling provided by this heating arrangement substantially reduces thermal lag and the recorded temperature associated with the gravimetric indication are relatively accurate indications of sample temperatures.

In accordance with another feature of the present invention, a distinct, reversible, reproducible, calibrating temperature indication is displayed by the recorder 44. This indication is displayed as a distinct gravimetric variation at a known temperature. A means for establishing a magnetic field in the vicinity of the sample container 16 is shown in FIG. 1 to comprise a permanent magnet 70 supported on the enclosure member 21. The magnet 70 establishes a magnetic field gradient in the vicinity of the furnace. A magnetic material standard 72 having a predetermined Curie point temperature is positioned within the container 16 (FIG. 2). This standard material is comingled with the sample material 74 and is temperature programmed therewith. Alternatively, the apparatus is precalibrated by positioning the standard alone in the container and temperature programming the standard. In both cases, the magnetic field exerts a force on the material standard and causes the standard material to exhibit an apparent weight differing from its actual weight. As the furnace 46 heats the standard material through the programmed temperature range, the Curie point of the standard material will be reached and the indicated weight of the standard material will vary from its apparent weight to its gravimetric weight. This comprises a substantial change and causes a relatively large variation in motor current and a corresponding recorded, distinct indication on the chart. Since the Curie point temperature of the material is known, a relatively distinct and highly accurate temperature calibration is thereby provided.

Temperature calibration in this manner may be provided over a range of temperatures by positioning a plurality of standard ferromagnetic materials having differing Curie points in the container 16. Typical materials for use as standard materials are nickel having a Curie point of 360° C., iron having a Curie point of 770° C., and various nickel-ferrous alloys having Curie point temperatures intermediate those of nickel and iron. Other typical materials are nicoseal, 27 CR annealed iron, and high sat. 50 iron.

In FIG. 2, an alternative arrangement for calibrating a TGA apparatus in accordance with the present invention is illustrated in sectional form. The arrangement of FIG. 2 includes electromagnetic means comprising a winding 76 formed about the enclosure member 21 for establishing the magnetic field in the vicinity of the sample container 16. Elements in FIG. 2 performing similar functions as those elements described with respect to FIG. 1 bear similar reference numerals. The winding 72 is energized by conventional circuit means including a source of DC potential, not shown, and suitable means such as an adjustable resistive impedance for varying the magnitude of current flow in the winding 72 and the magnitude of the resultant field.

In both embodiments the magnetic field establishing means is adapted for altering the apparent weight of the sample material. The field may be adapted for causing a decrease or an increase in the apparent weight of the sample. In both instances, the apparent weight of the standard material may be nulled through a suitable balancing means for providing a zero weight output indication at the beginning of the program and prior to introducing the sample material into container 16.

In those instances when the sample under investigation exhibits ferromagnetic properties, the instrument is precalibrated with a standard material alone and the magnetic field means is removed from the vicinity of the sample during temperature programming. Alternatively, the sample itself is heated to its Curie point before useful gravimetric analysis is initiated.

A particular circuit arrangement utilizing the heater element 52 for both heating and temperature sensing is illustrated in FIG. 3. This arrangement is disclosed and claimed in copending U.S. patent application No. 673,040, filed on Oct. 5, 1967, which is assigned to the assignee of the present invention. In FIG. 3, a conventional electromechanical chopper 82 is shown having terminals 84 and 86 thereof coupled respectively to a first voltage divider 88 and a second voltage divider 90. The chopper is operated at 60-cycles, for example. The voltage divider 90 includes the heater element 52, a resistive impedance 92 and a source of DC potential 94. A DC voltage is established across element 52 which is proportional to heater resistance and accordingly heater temperature. The output impedance of the divider 90 is arranged to be substantially less than the original impedance of the voltage divider 88. As a chopper swinger arm 96 periodically makes and breaks contact with a terminal 86, a DC voltage having an AC signal component will appear at terminal 84. This signal is indicative of a deviation between the programmed temperature and temperature of heater element 52. The AC signal component is amplified and applied via a conventional firing circuit 98 to a silicon control rectifier 100. Electrical energy derived from a line source 102 is applied to the heater element 52 via the SCR 100 in accordance with the amplitude of the AC signal component. As the temperature of the element 52 approaches the setpoint temperature $T_{sp}$ as represented by a slowly varying DC voltage from the program source 60, the AC signal component amplitude also decreases. The circuit arrangement of FIG. 3 is thus adapted for applying heating energy to the element 52 during a first part of a heating-temperature sensing cycle when the swinger arm has broken contact with terminal 86, and, for sensing heater temperature during that part of the chopper cycle when the swinger arm makes contact with terminal 86.

An improved TGA apparatus has thus been described which advantageously provides a relatively accurate temperature indication of sample temperature. In addition, it provides an accurate reversible, reproducible temperature calibration.

While I have illustrated and described a particular embodiment of my invention, it will be understood that various modifications may be made therein without departing from the spirit of the invention and the scope of the appended claims.

I claim:

1. A thermal gravimetric analysis apparatus comprising:
   means including a sample container for sensing and indicating the weight of a sample under analysis;
   a magnetic standard material positioned within said sample container, said material having a Curie point temperature $T_c$, said material having a magnetic flux density versus temperature characteristic exhibiting an abrupt transition near the Curie point of said material;
   means for varying the temperature of the sample container over a range of temperatures, said range including said Curie point temperature $T_c$; and,
   means for establishing a magnetic field in the vicinity of said sample container whereby a force exerted by said field on said standard material causes the material to exhibit an indicated weight differing from the actual weight of the material.

2. A thermal gravimetric analysis apparatus comprising:
   means including a sample container adapted for indicating the weight of a sample;
   a magnetic material positioned in said sample container, said magnetic material having a Curie point temperature $T_c$, said material having a magnetic flux density versus temperature characteristic exhibiting an abrupt transition near the Curie point of said material;
   means including an electric furnace positioned with respect to said sample container for heating the sample container over a predetermined range of temperatures, said range of temperatures including the temperature $T_c$; and,
   means for establishing a magnetic field in the vicinity of said sample container.

3. In a thermal gravimetric analysis apparatus having means including a sample container for sensing and indicating the weight of a sample under analysis and means for heating the sample container over a predetermined range of temperatures, a temperature calibrating arrangement for said apparatus comprising means for establishing a magnetic field in the vicinity of said container and a magnetic standard material positioned in said sample container, said material having a Curie point temperature $T_c$ within said predetermined range of temperatures, said material having a magnetic flux density versus temperature characteristic exhibiting an abrupt transition near the Curie point of said material.

4. A thermal gravimetric analysis apparatus comprising:
   a generally L-shaped evacuated enclosure;
   said enclosure including first and second demountable members for providing access to the interior of said enclosure;
   a gravimetric weight sensing means mounted in said first enclosure member;
   a generally tubular electric furnace positioned within said second enclosure member;
   said weight sensing means including a sample container depending from said lever arm and extending into said furnace;
   said electric furnace including a heater-sensor element wound thereon;
   means for heating said sample container in accordance with a predetermined program over a range of temperatures, said heating means including circuit means coupled to said heater-sensor element for heating said sample container during a first part of a heating-temperature sensing cycle and for providing an electrical indication of the temperature thereof during a second part of the cycle;
   said weight sensing means including means for sensing and providing an electrical indication of a variation in weight of the contents of said container;
   recording means, coupled to said heating means and said weight sensing means for recording the weight of the contents of said container over a predetermined range of temperatures;
   magnetic means positioned about said second enclosure member and adapted for establishing a magnetic field in the vicinity of said container; and,
   a magnetic standard material positioned in said container and having a Curie point temperature within said predetermined temperature range, said material having a magnetic flux density versus temperature characteristic exhibiting an abrupt transition near the Curie point of said material.

5. A method for calibrating a thermal gravimetric analysis apparatus comprising the steps of:
   positioning a magnetic material standard and a sample material within a sample container of a sensitive balance, said material standard having a Curie point temperature and a magnetic flux density versus temperature characteristic exhibiting a relatively abrupt transition near said Curie point;
   establishing a magnetic field in the vicinity of said container;
   heating the container over a predetermined range of temperatures; and,
   recording the apparent weight of said sample container as a function of temperature within said range.

6. In a thermal gravimetric process wherein the weight of a material under treatment or analysis varies in accordance with variations in its environmental conditions, the improved method for generating an indication of environmental temperature comprising the steps of:

positioning a quantity of a sample material under analysis and a ferromagnetic reference material having a predetermined Curie temperature and a gravimetric weight in the environment, said environment having a temperature subject to variation, said reference material having a flux density versus temperature characteristic exhibiting an abrupt transition near the Curie temperature;

establishing a magnetic field in the vicinity of said reference sample and thereby causing said reference sample to exhibit an apparent weight differing from said gravimetric weight; and, monitoring the weight of the sample as a function of temperature and detecting a change in weight of the reference material from its apparent to its gravimetric weight thereby indicating when the environmental temperature and the temperature of the sample under analysis has attained the predetermined Curie temperature.

7. A thermal gravimetric analysis apparatus comprising:

an enclosure;

gravimetric weight sensing means positioned within said enclosure;

said means including a lever arm and a sample container depending from said lever arm;

heating means including an electric furnace positioned within said enclosure and having close thermal coupling with said container and adapted for heating said sample container over a predetermined range of temperatures;

means for establishing a magnetic field in the vicinity of said sample container;

a magnetic standard material positioned within said sample container, said material having a flux density versus temperature characteristic exhibiting an abrupt transition near a Curie point for said material, said material having a Curie point within said predetermined range of temperatures; and means for recording the weight of a sample under analysis throughout the predetermined range of temperatures.

8. The apparatus of claim 7 wherein said means for establishing a magnetic field comprises a permanent magnet positioned outside said enclosure.

9. The apparatus of claim 7 wherein said means for establishing said magnetic field comprises electromagnetic means positioned outside said enclosure.

References Cited

UNITED STATES PATENTS

| | | | |
|---|---|---|---|
| 2,642,742 | 6/1953 | Heidenwolf | 73—355 |
| 2,756,595 | 7/1956 | Rathenau et al. | 73—362 |
| 2,841,681 | 7/1958 | Negromanti | 219—499 |
| 3,103,573 | 9/1963 | Niehaus | 219—499 |
| 3,172,493 | 3/1965 | Koch et al. | 73—15 |

OTHER REFERENCES

Chapman et al., "Volatility of $UO_{2+x}$ and Phase Relations in the System Uranium-Oxygen" in The Journal of the American Chemical Society December 1964, pp. 614–616.

JAMES J. GILL, Primary Examiner

H. GOLDSTEIN, Assistant Examiner

U.S. Cl. X.R.

73—15